F. D. RUGG.
SUPPORT FOR ICE CREAM FREEZERS.
APPLICATION FILED JAN. 15, 1920.
1,421,724.
Patented July 4, 1922.
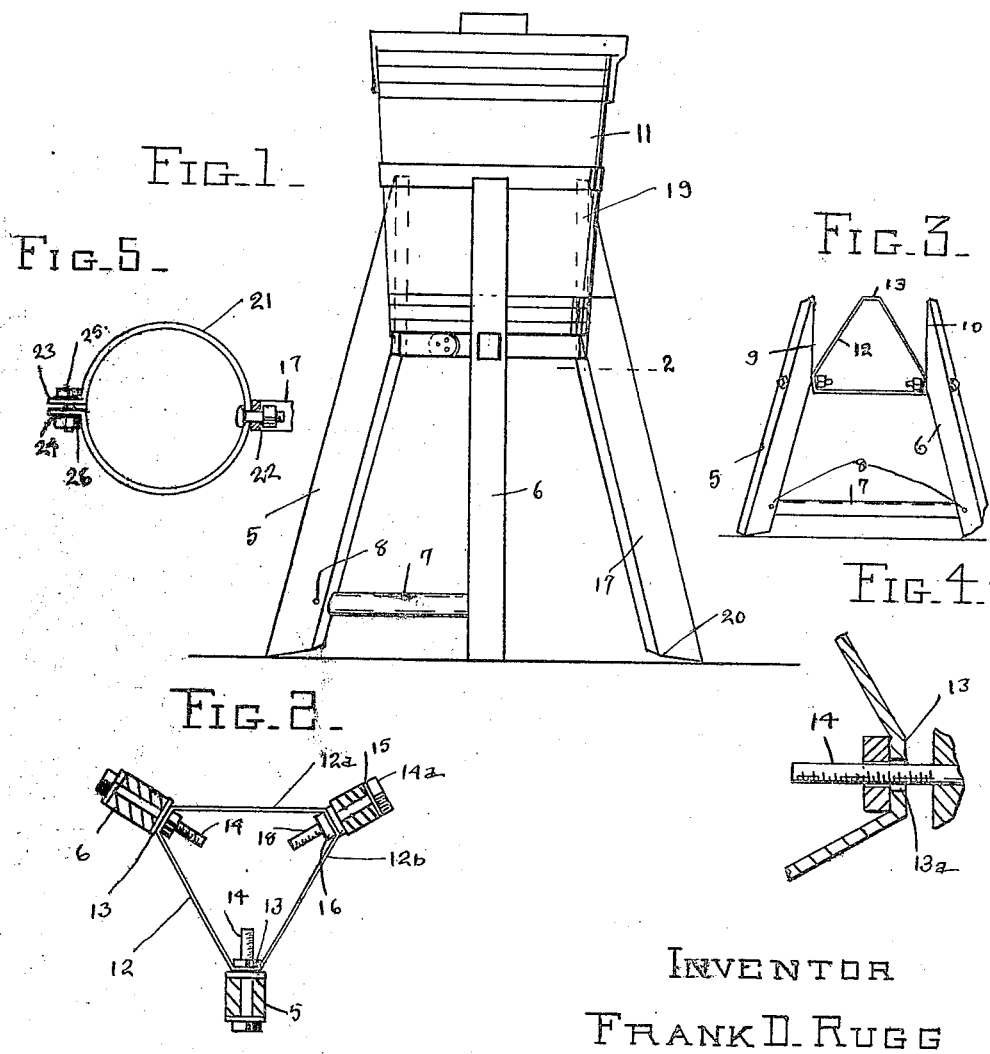
INVENTOR
FRANK D. RUGG
By Joseph J. O'Brien
ATTORNEY

UNITED STATES PATENT OFFICE.

FRANK D. RUGG, OF GREENFIELD, MASSACHUSETTS.

SUPPORT FOR ICE-CREAM FREEZERS.

1,421,724.  Specification of Letters Patent.  Patented July 4, 1922.

Application filed January 15, 1920. Serial No. 351,692.

*To all whom it may concern:*

Be it known that FRANK D. RUGG, a citizen of the United States of America, residing at Greenfield, in the county of Franklin and State of Massachusetts, has invented certain new and useful Improvements in Supports for Ice-Cream Freezers, of which the following is a specification.

This invention relates to improvements in supports for ice cream freezer pails and one of the objects of the invention is to provide a simple support by means of which pails of various sizes can be clamped thereon and held while the ice cream receptacle or can within the freezer pail is being rotated by the usual crank.

Another object of the invention is to provide a device of this character with a simple method of clamping the pail to the supporting legs.

With the above and other objects in view this invention relates to certain new and useful constructions, combinations and arrangements of parts, clearly described in the following specification and fully illustrated in the accompanying drawings, in which:

Figure 1 is a view in elevation showing an ice cream pail supported on the device.

Figure 2 is a horizontal sectional view.

Figure 3 is a side elevation on a reduced scale showing the connecting ring in its folded position.

Figure 4 is a detail sectional view on an enlarged scale of a portion of the leg connecting ring.

Figure 5 is a plan view of a pail clamping ring for holding metal pails on the device.

Referring to the accompanying drawings 5 and 6 designate upright members which are connected to each other by a rung or brace 7, the ends of which are inserted in sockets formed in the lower portions of the members 5 and 6 and fastened in place by means of nails or the like 8. The upper ends of the members 5 and 6 are formed with diagonal or inclined faces 9 and 10 which are adapted to have contacting engagement with the side of the freezer pail 11. The upper end portions of the members 5 and 6 are connected to each other by means of a triangular brace 12 which is provided with flat portions 13 adapted to receive the bolts 14 and said portions 13 have openings or holes $13^a$ considerably larger in diameter than the bolts 14 so that there can be a certain amount of relative movement between the triangular brace 12 and said bolts. The outer portions of the bolts extend through the upper ends of the uprights 5 and 6 and the outer ends of said bolts are provided with rectangular or hexagonal heads $14^a$ which bear against washers 15 interposed between said heads and the outer portions of the members 5 and 6. On the inner end portions of the bolts 14 the nuts 16 are threaded and these nuts are locked against relative rotation by the inclined sides $12^a$ and $12^b$ of the triangular brace. The bolts 14 extend through the members 5 and 6 obliquely instead of at right angles, so that the brace 12 will be held in proper horizontal position.

A third upright member 17, similar in construction to the members 5 and 6 is also provided and is connected by the bolt 18 with the triangular brace 12 in the manner similar to the connection of said members 5 and 6 with said brace. A screw 19 is threaded through the upper end portion of the member 17 into the freezer pail 11 to prevent pivotal movement of the supporting leg on the brace.

The upper end portions of the members 5, 6 and 17 are clamped against the pail 11 by tightening the bolts 14 and 18 on the triangular brace 12 and the nuts for said bolts, by turning the outer ends of said bolts with a suitable wrench or tool. The lower end portions of the members 5, 6 and 17 are inclined upwardly and inwardly at 20 so that the weight of the freezer pail resting upon the triangular brace 12 will tend to force the outer ends of the supporting legs outwardly and the upper ends inwardly against the freezer pail, thus securely holding the same on said supporting legs. By detaching the screw 19 and disconnecting the bolt 18 the supporting leg 17 may be detached from the brace 12 and said brace shifted to the position shown in Figure 3 to permit of the shipment of the device in compact and partly knock-down condition.

In order to secure a metal pail one of the supporting legs 17 may be equipped with a split band 21 secured thereto by means of a pivot or similar bolt 22 and provided with confronting terminal lugs 23 and 24 which are adapted to be closed by means of a threaded bolt 25 and a nut 26, so as to tighten the band 21 around the freezer pail. The band 21 is placed around the pail and the nut 26 tightened on the bolt 25 to close said band so as to thoroughly grip the pail, the split band thus grips the body of the metal pail while the triangular member 12, provides a support for the lower end of the pail.

When a person desires to rotate the food or cream receptacle contained in the pail 11 by means of the usual driving mechanism one foot is preferably placed upon the rung or brace 7 so as to control the entire device and prevent wobbling, tilting or walking of the freezer.

Having described my invention, I claim:

1. A pail or freezer support consisting of a pair of legs, each of the legs having a beveled pail engaging face on its upper end, a rung connecting the lower end portions of the legs to each other, a band adapted to form a seat for the pail, and having pivotal connection with the upper end portions of the legs, and a third leg pivotally connected with the band and provided with a pail engaging face on its upper end, the third leg being detachable and the band being capable of swinging into longitudinal relation with the legs to permit the support to be folded.

2. A pail or freezer support consisting of a pair of legs, a rung connecting the lower end portions of the legs to each other, a band, a bolt connecting the band to the upper end portion of each leg at a point below the terminal thereof, each leg having a pail engaging face on the side thereof extending from the band to the upper terminal thereof, said band being of triangular shape and constituting a seat for the pail, and a third leg detachably bolted to said band and having a pail engaging face extending above its point of connection with said band, whereby the weight of a pail will cause the upper end portions of said legs to hug the same.

Signed by me at Greenfield, Mass.

FRANK D. RUGG